(12) United States Patent
Aoki et al.

(10) Patent No.: US 12,360,258 B2
(45) Date of Patent: Jul. 15, 2025

(54) RADIATION IMAGE SENSOR

(71) Applicants: NATIONAL UNIVERSITY CORPORATION SHIZUOKA UNIVERSITY, Shizuoka (JP); ANSeeN Inc., Hamamatsu (JP)

(72) Inventors: Toru Aoki, Hamamatsu (JP); Katsuyuki Takagi, Hamamatsu (JP); Akifumi Koike, Hamamatsu (JP)

(73) Assignees: NATIONAL UNIVERSITY CORPORATION SHIZUOKA UNIVERSITY (JP); ANSEEN INC. (JP)

( * ) Notice: Subject to any disclaimer, the term of this patent is extended or adjusted under 35 U.S.C. 154(b) by 244 days.

(21) Appl. No.: 17/915,790

(22) PCT Filed: Mar. 30, 2020

(86) PCT No.: PCT/JP2020/014647
§ 371 (c)(1),
(2) Date: Sep. 29, 2022

(87) PCT Pub. No.: WO2021/199195
PCT Pub. Date: Oct. 7, 2021

(65) Prior Publication Data
US 2023/0204799 A1     Jun. 29, 2023

(51) Int. Cl.
G01T 1/17     (2006.01)
(52) U.S. Cl.
CPC ..................... *G01T 1/17* (2013.01)
(58) Field of Classification Search
None
See application file for complete search history.

(56) References Cited

U.S. PATENT DOCUMENTS

| 5,067,090 A | 11/1991 | Seeman | 364/486 |
| 2012/0298875 A1* | 11/2012 | Ueno | G01T 1/17 |
| | | | 250/362 |

(Continued)

FOREIGN PATENT DOCUMENTS

| JP | H07-055946 A | 3/1995 |
| JP | 2010-078338 A | 4/2010 |

(Continued)

OTHER PUBLICATIONS

Takagi, Katsuyuki, et al.: "Implementation of energy integration read-out circuit by digital signal processing with energy weighting function", Proceedings of the 80$^{th}$ JSAP Autumn Meeting, Japan Society of Applied Physics. 2019, p20p-PB4-77.

(Continued)

*Primary Examiner* — Hoon K Song
(74) *Attorney, Agent, or Firm* — OSTROLENK FABER LLP

(57) ABSTRACT

A radiation detector includes a charge generation part configured to generate charge corresponding to energy of an incident radiation, a preamplification part configured to output an analog signal corresponding to the charge, a signal conversion part configured to receive the analog signal and output a digital signal being the analog signal that has been discretized, an energy discrimination part configured to compare the digital signal to a threshold value and output components of the digital signal exceeding the threshold value, and an energy integration part configured to obtain an energy integrated value defined as a summation of the components exceeding the threshold value obtained each time the radiation enters.

3 Claims, 14 Drawing Sheets

(56) References Cited

U.S. PATENT DOCUMENTS

2014/0193768 A1\* 7/2014 Ogawa ................. A61B 6/5205
433/29
2019/0086561 A1\* 3/2019 Viswanath .............. G01T 1/247

FOREIGN PATENT DOCUMENTS

| JP | 2012-233727 A | 11/2012 |
| JP | 2014-527162 A | 10/2014 |
| JP | 2014-239426 A | 12/2014 |
| JP | 2015-516832 A | 6/2015 |
| JP | 2017-020912 A | 1/2017 |
| WO | WO 2013/017425 A1 | 2/2013 |
| WO | WO 2013/144812 A2 | 10/2013 |
| WO | WO 2017/086181 A1 | 5/2017 |
| WO | WO 2020/054756 A1 | 3/2020 |

OTHER PUBLICATIONS

International Search Report mailed Jun. 9, 2020 in corresponding PCT International Application No. PCT/JP2020/014647.
English translation of the International Preliminary Report on Patentability (IPRP) (Chapter 1 or II of the PCT Treaty) mailed Oct. 13, 2022 with a Notification from the International Bureau (Form PCT/IB/338) in corresponding PCT International Application No. PCT/JP2020/014647.

\* cited by examiner

RADIATION IMAGE SENSOR

TECHNICAL FIELD

The present disclosure describes a radiation detector.

BACKGROUND ART

Techniques have been developed for detecting radiation. Radiation detection techniques are expected to be applied in the fields of medicine, industry, security, and the like. The radiation detection techniques include a charge accumulation method. A radiation detector that employs the charge accumulation method generates charge corresponding to the energy of radiation, and obtains information relating to the radiation using a value obtained by integrating the charge. A photon counting method is another technique. A radiation detector that employs the photon counting method treats radiation as particles. That is, it obtains information relating to the radiation using the number of particles incident on the detector (see, Patent Literatures 1 and 2).

CITATION LIST

Patent Literature

Patent Literature 1: Japanese Unexamined Patent Publication No. 2014-527162
Patent Literature 2: Japanese Unexamined Patent Publication No. 2015-516832

SUMMARY OF INVENTION

Technical Problem

Photon counting radiation detectors count the number of particles (photons). When counting the number of particles, signal components are discriminated from noise. Photon counting radiation detectors thus tend to have fewer noise problems. However, the incident timing of radiation is not uniform. As a result, the number of particles of a count result may differ from the actual number of incident particles. Charge accumulation radiation detectors, on the other hand, integrate signal components (charge signals) corresponding to incident radiation. An integration operation does not cause problems caused by errors in counting the number of particles such as in the photon counting radiation detectors. However, an integration operation integrates not only true signal components resulting from incident radiation, but also noise resulting from dark current and the like.

The present disclosure describes a radiation detector that is capable of reducing the effect of noise.

Solution to Problem

A radiation detector according to one embodiment of the present disclosure includes a charge generation part configured to generate charge corresponding to energy of an incident radiation, a preamplification part configured to output an analog signal corresponding to the charge, a signal conversion part configured to receive the analog signal and convert the analog signal into a digital signal, an energy discrimination part configured to compare the digital signal to a threshold value and output components of the digital signal exceeding the threshold value, and an energy integration part connected to the energy discrimination part, and configured to obtain an energy integrated value defined as a summation of the components exceeding the threshold value obtained each time the radiation enters.

In this radiation detector, noise is removed from the digital signal output from the signal conversion part at the energy discrimination part. The digital signal from which noise has been removed is then integrated for each energy at the energy integration part. The radiation detector of the present disclosure is thus capable of reducing the effect of noise.

In one embodiment, the amplification part may output the analog signal each time the radiation enters. The signal conversion part may output the digital signal each time the analog signal is received. The energy integration part may add up the digital signals each time the digital signal is received. This configuration allows an integration operation of the energy integration part to be successively performed each time the radiation enters. Thus, since the integration operation can be achieved by a simple addition operation, the circuit configuration is simple. As a result, the radiation detector can be made smaller.

In one embodiment, the signal conversion part may output the digital signal indicating a magnitude of the analog signal by N pulse waves (N being an integer of 1 or more). The energy integration part may add up the number of the pulse waves making up the digital signal each time the digital signal is received. This configuration enables the integration operation to be achieved by an even simpler counting operation, so that the circuit configuration is even simpler. As a result, the radiation detector can be made even smaller.

In one embodiment, the energy discrimination part may output i-th (i being an integer of 1 or more) to N-th pulse waves of the N pulse waves as the components exceeding the threshold value. This configuration is capable of simplifying a discrimination operation performed by the energy discrimination part. As a result, the circuit configuration of the energy discrimination part is simplified, so that the radiation detector can be made even smaller.

In one embodiment, the radiation detector may further include a counter connected in parallel with the energy integration part, and configured to count the number of inputs of the digital signal to the energy integration part, and an energy correction part connected to the counter and the energy integration part, and configured to correct the energy integrated value output by the energy integration part using the number of the inputs and a threshold value indicated by the first to the i−1-th pulse waves. This configuration allows the energy integrated value to be corrected, so that the energy of the radiation obtained from the energy integrated value approaches the actual energy of the radiation.

ADVANTAGEOUS EFFECTS OF INVENTION

The radiation detector of the present disclosure is capable of reducing the effect of noise.

Figure 2:
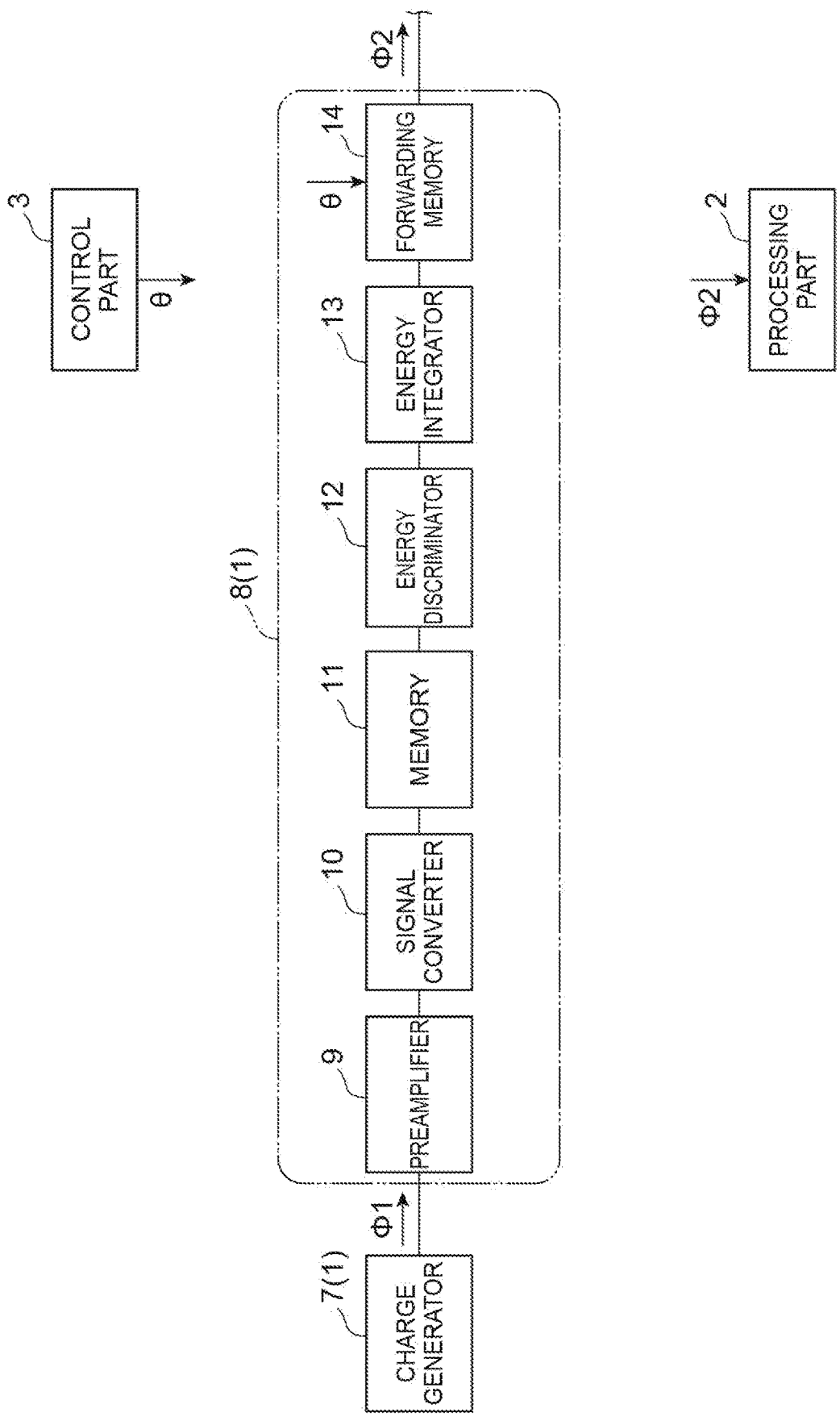
FIG. 2 is a diagram illustrating a configuration of the radiation detector shown in FIG. 1.
Figure 6:
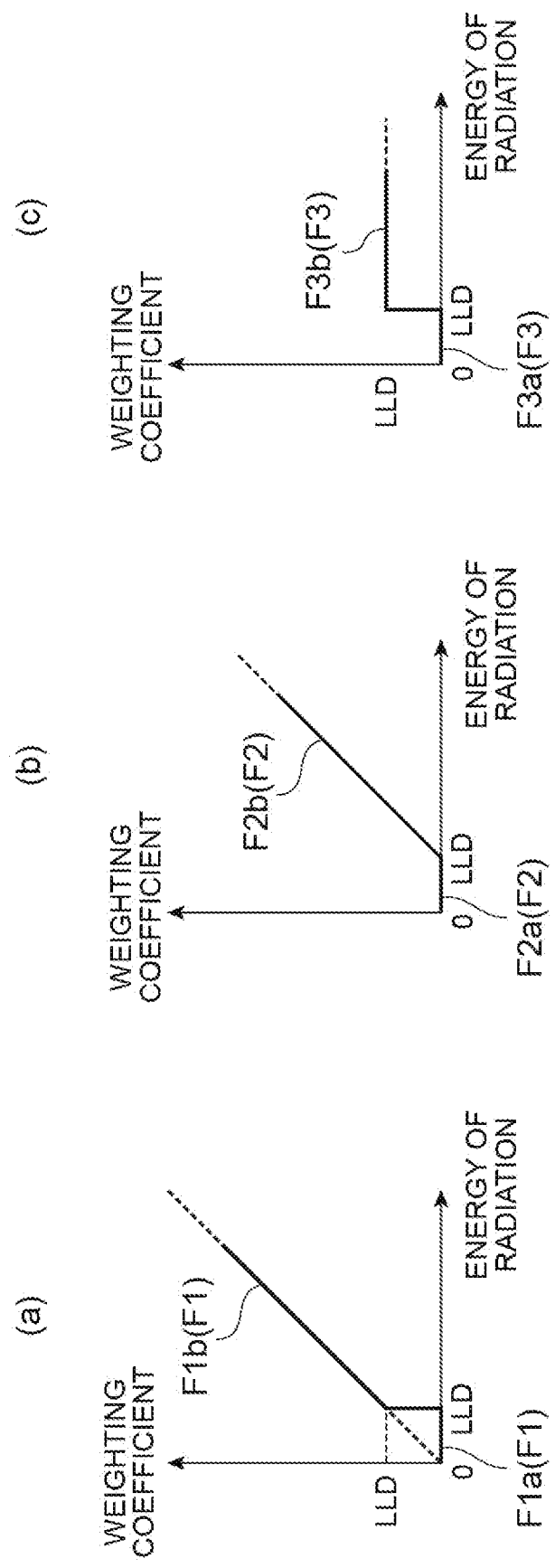

FIG. 6(a) is a weight function representing operations of the radiation detector and energy integration of FIG. 2. FIG. 6(b) is a weight function representing an energy integration operation different from that of FIG. 6(a). FIG. 6(c) is a weight function representing a photon counting operation.

Figure 7:
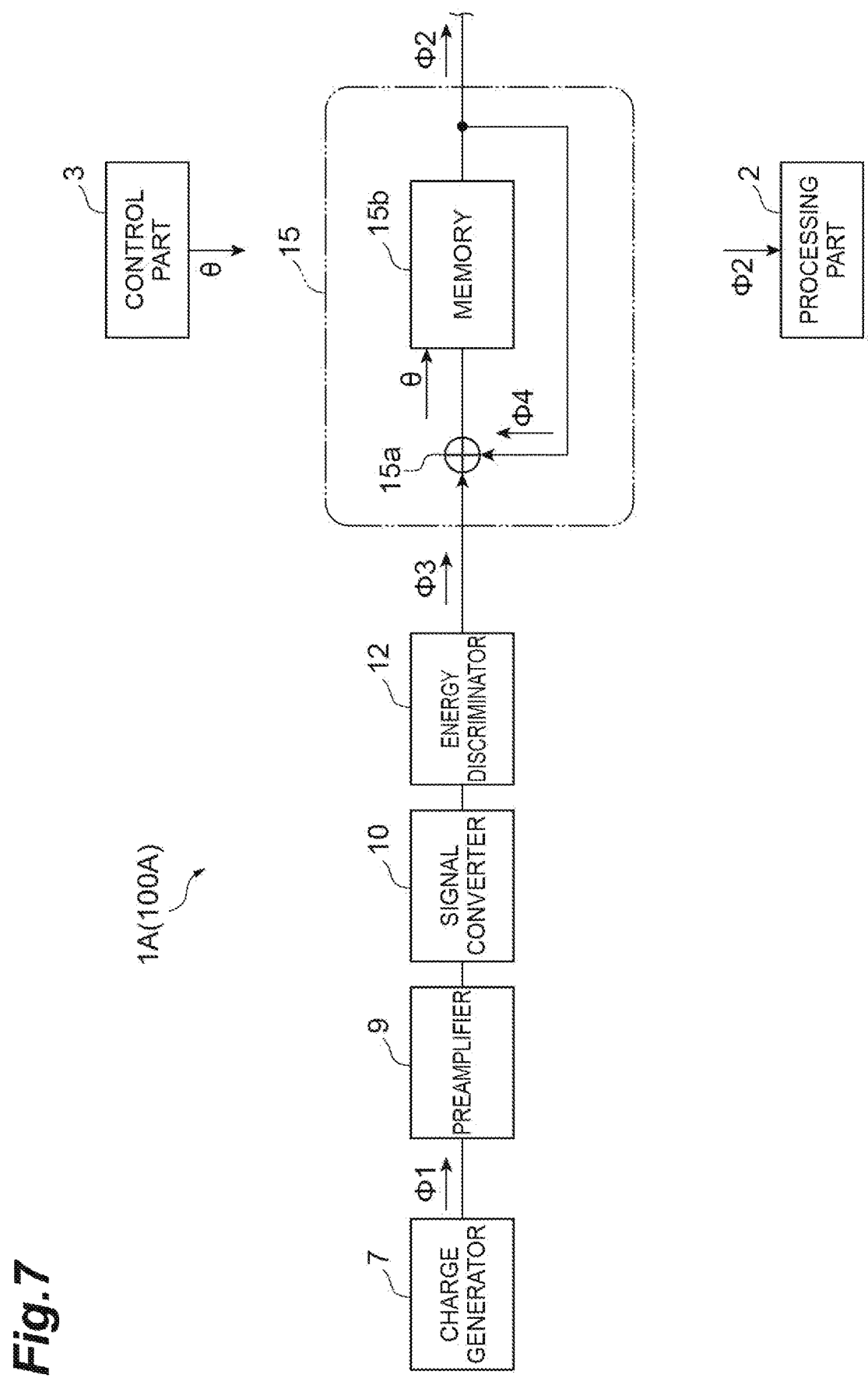

FIG. 7 is a diagram illustrating a configuration of a radiation detector of a second embodiment.

Figure 8:
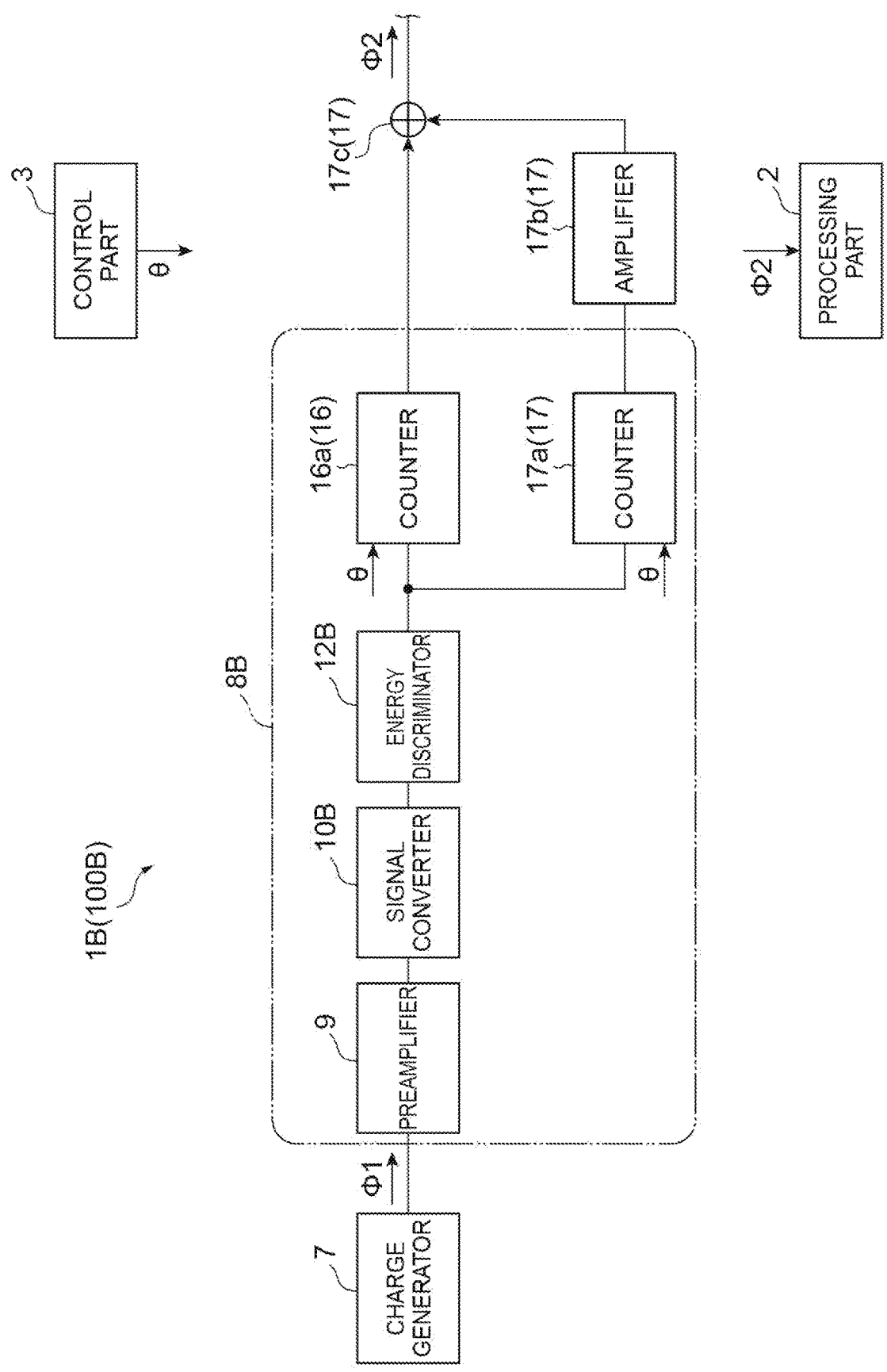

FIG. 8 is a diagram illustrating a configuration of a radiation detector of a third embodiment.

Figure 9:
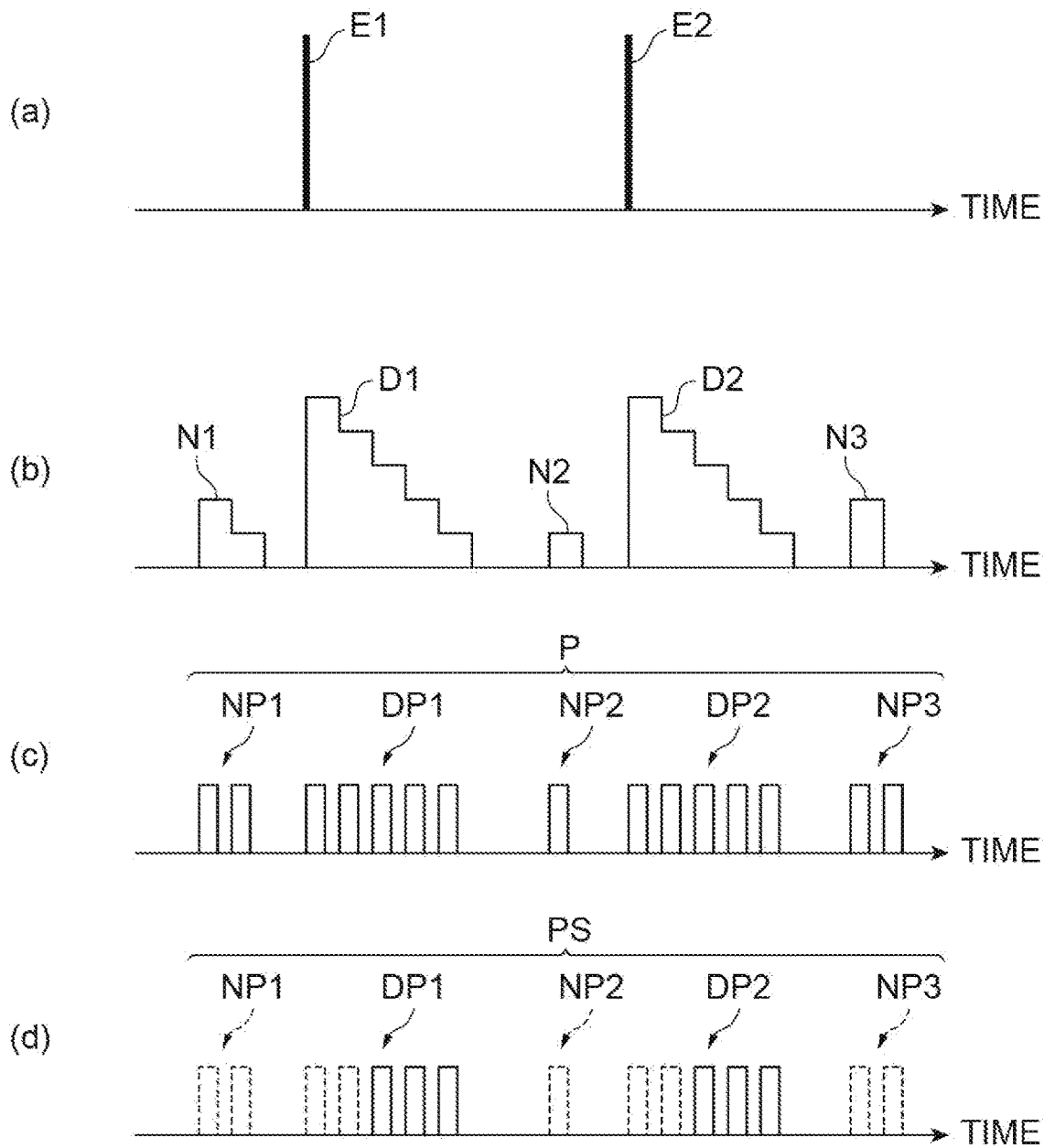

FIG. 9(a) is a diagram illustrating incident timings of radiation. FIG. 9(b) is a diagram illustrating an example of a digital signal output by a signal conversion part. FIG. 9(c) is a diagram illustrating another example of the digital signal output by the signal conversion part. FIG. 9(d) is a diagram illustrating an example of a digital signal output by an energy discrimination part.

Figure 10:
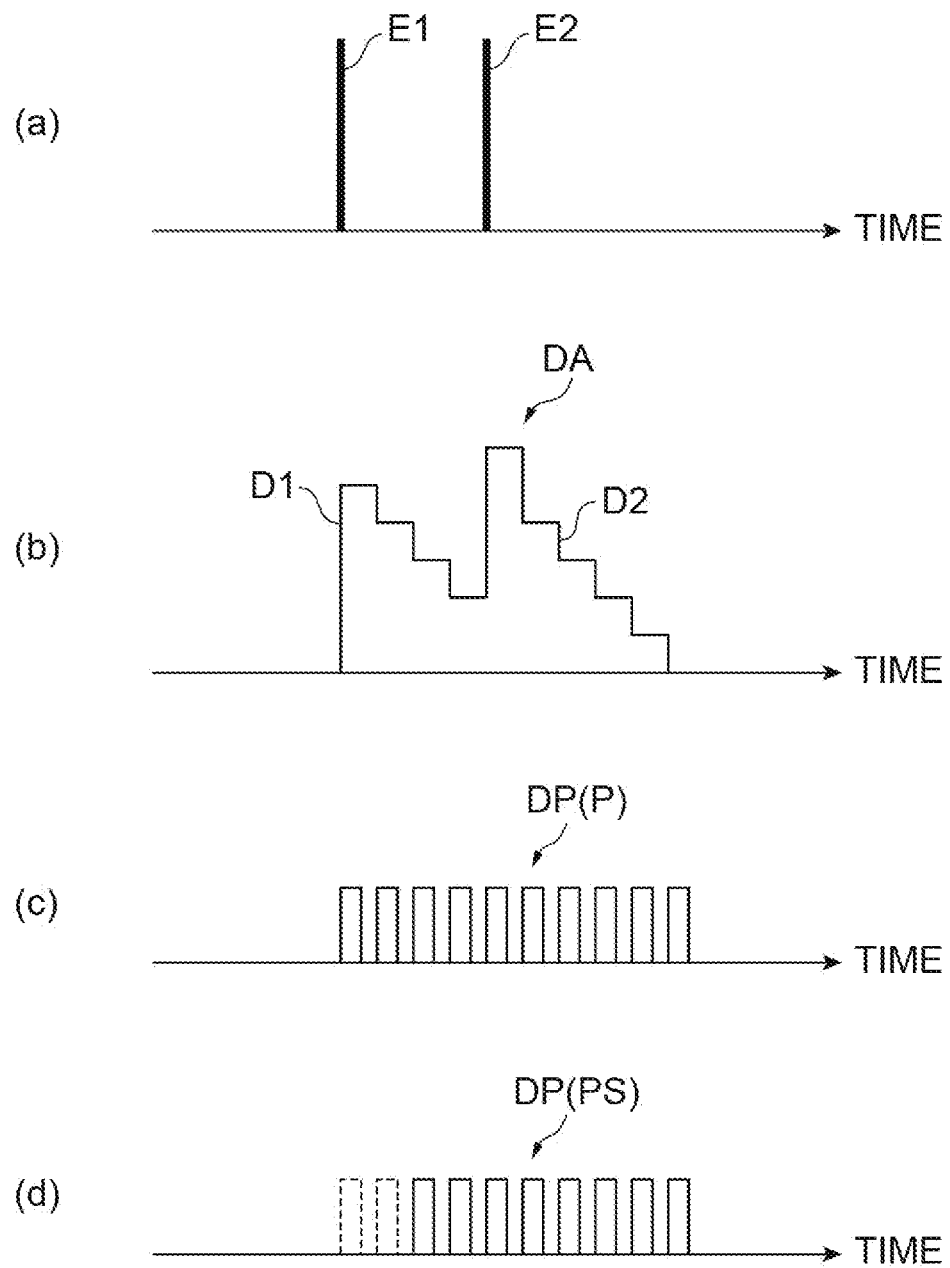

FIG. 10(a) is a diagram illustrating the incident timings of radiation. FIG. 10(b) is a diagram illustrating an example of the digital signal output by the signal conversion part. FIG. 10(c) is a diagram illustrating another example of the digital signal output by the signal conversion part. FIG. 10(d) is a diagram illustrating an example of the digital signal output by the energy discrimination part.

Figure 11:
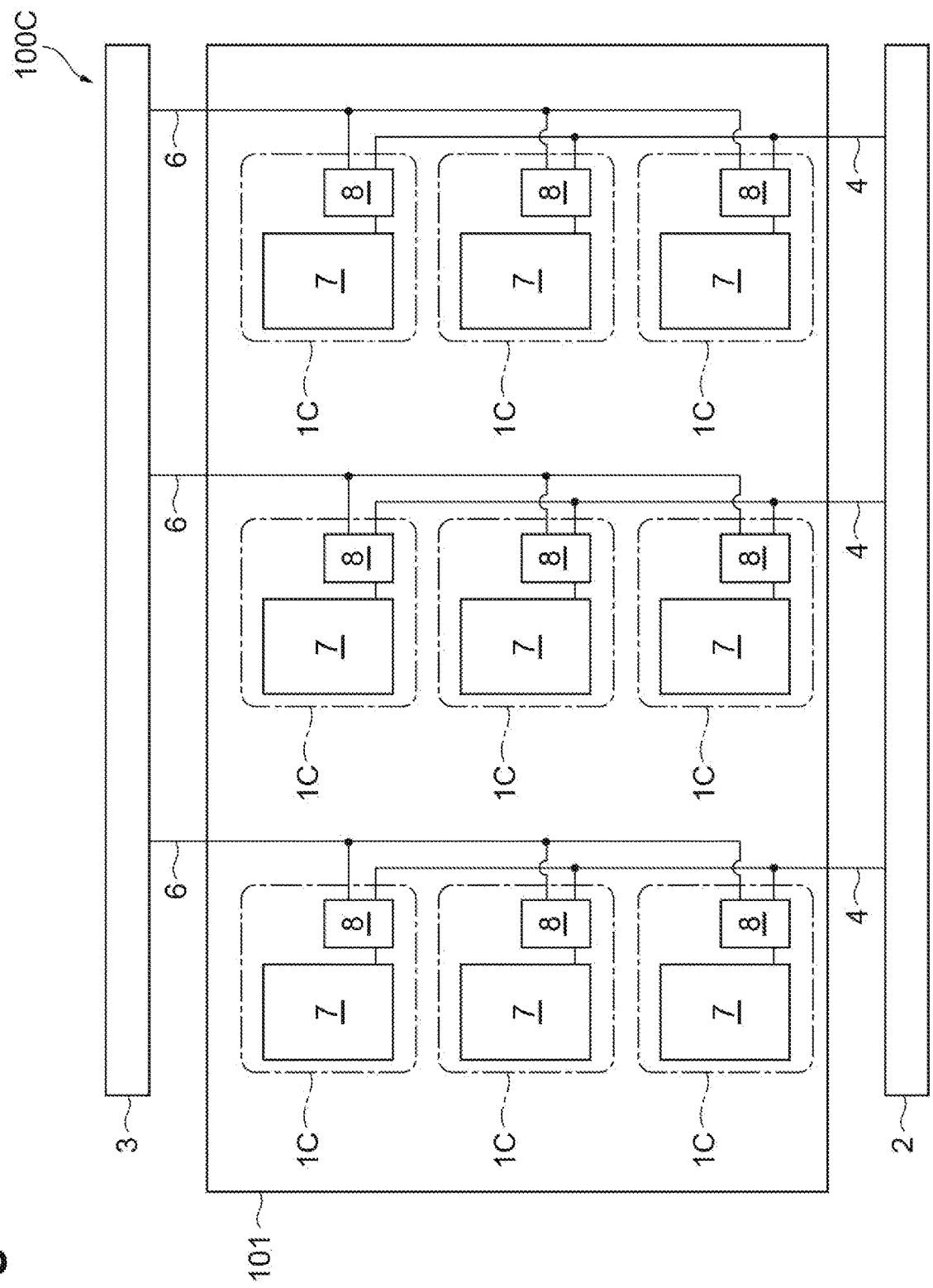

FIG. 11 is a diagram illustrating a radiation image sensor including a radiation detector according to a first variation.

Figure 12:
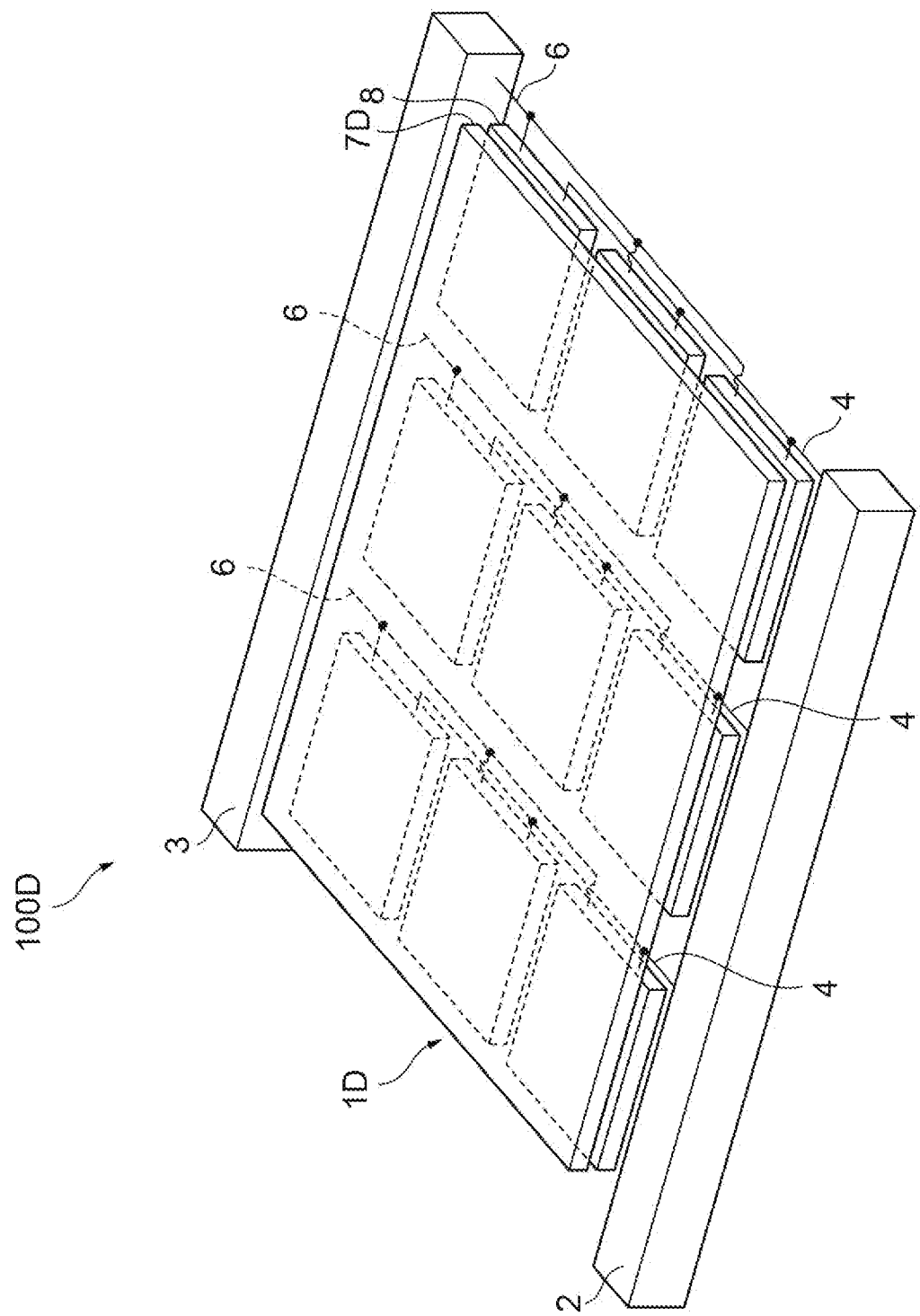

FIG. 12 is a diagram illustrating a radiation image sensor including a radiation detector according to a second variation.

Figure 13:
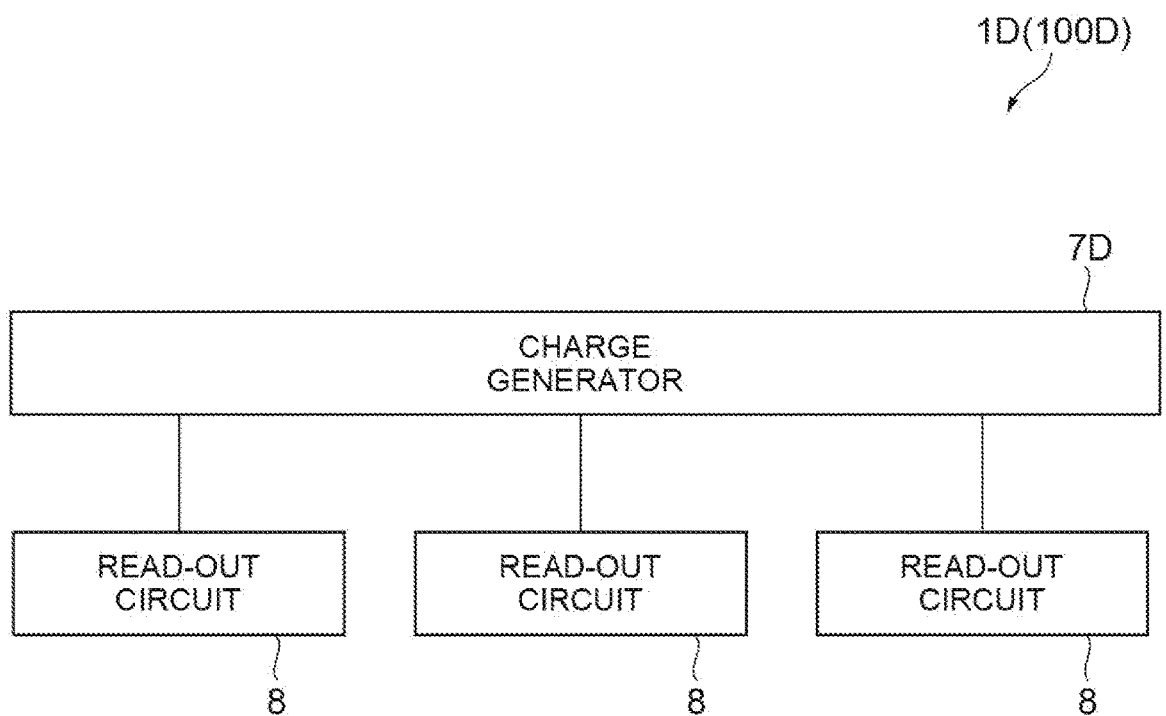

FIG. 13 is a block diagram illustrating the radiation image sensor including the radiation detector according to the second variation.

Figure 3:
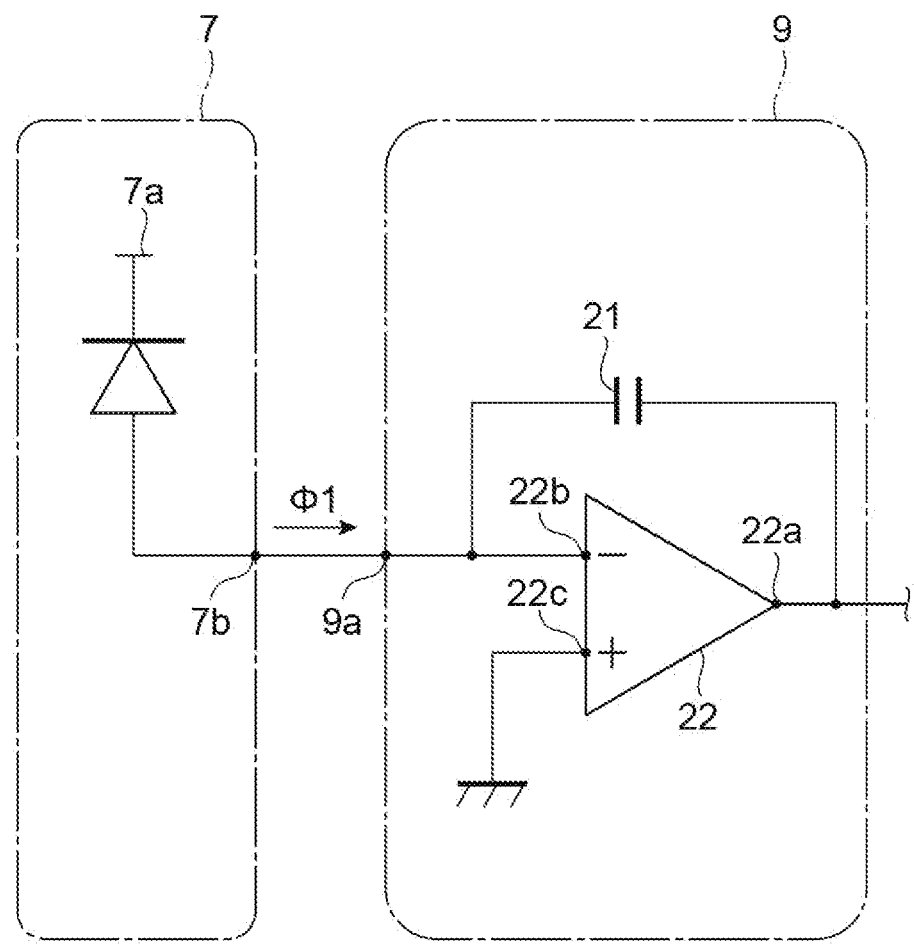
FIG. 3 is a diagram illustrating an example of circuit configurations of a charge generator and a preamplifier shown in FIG. 2.
Figure 14:
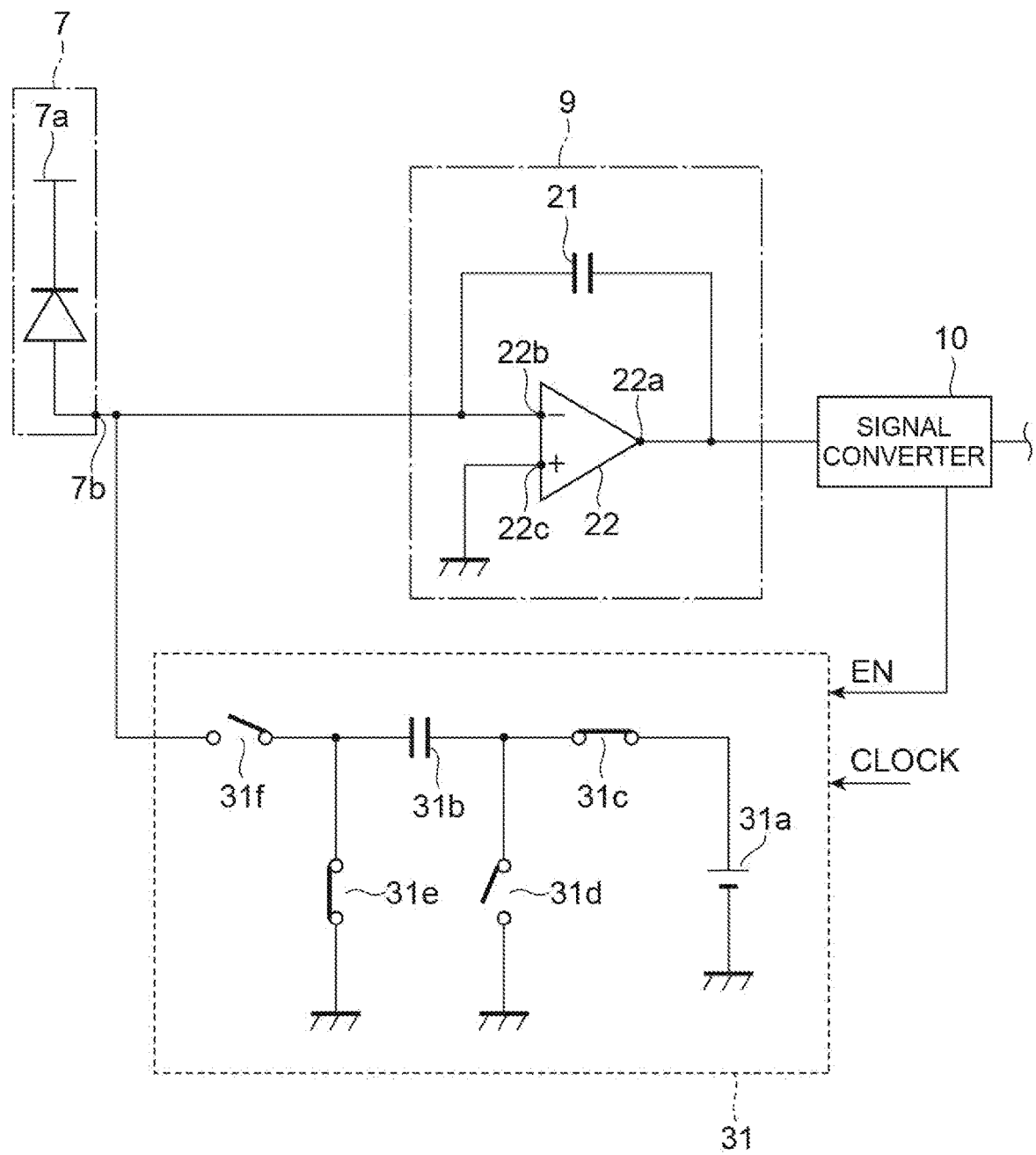

FIG. 14 is a diagram illustrating a variation of the circuit configurations including the charge generator and the preamplifier shown in FIG. 3.

DESCRIPTION OF EMBODIMENTS

A radiation detector of the present disclosure will be described in detail below with reference to the accompanying drawings. It should be noted that like elements are given like reference signs in the description of the drawings, and redundant explanation is omitted.

First Embodiment

Figure 1:
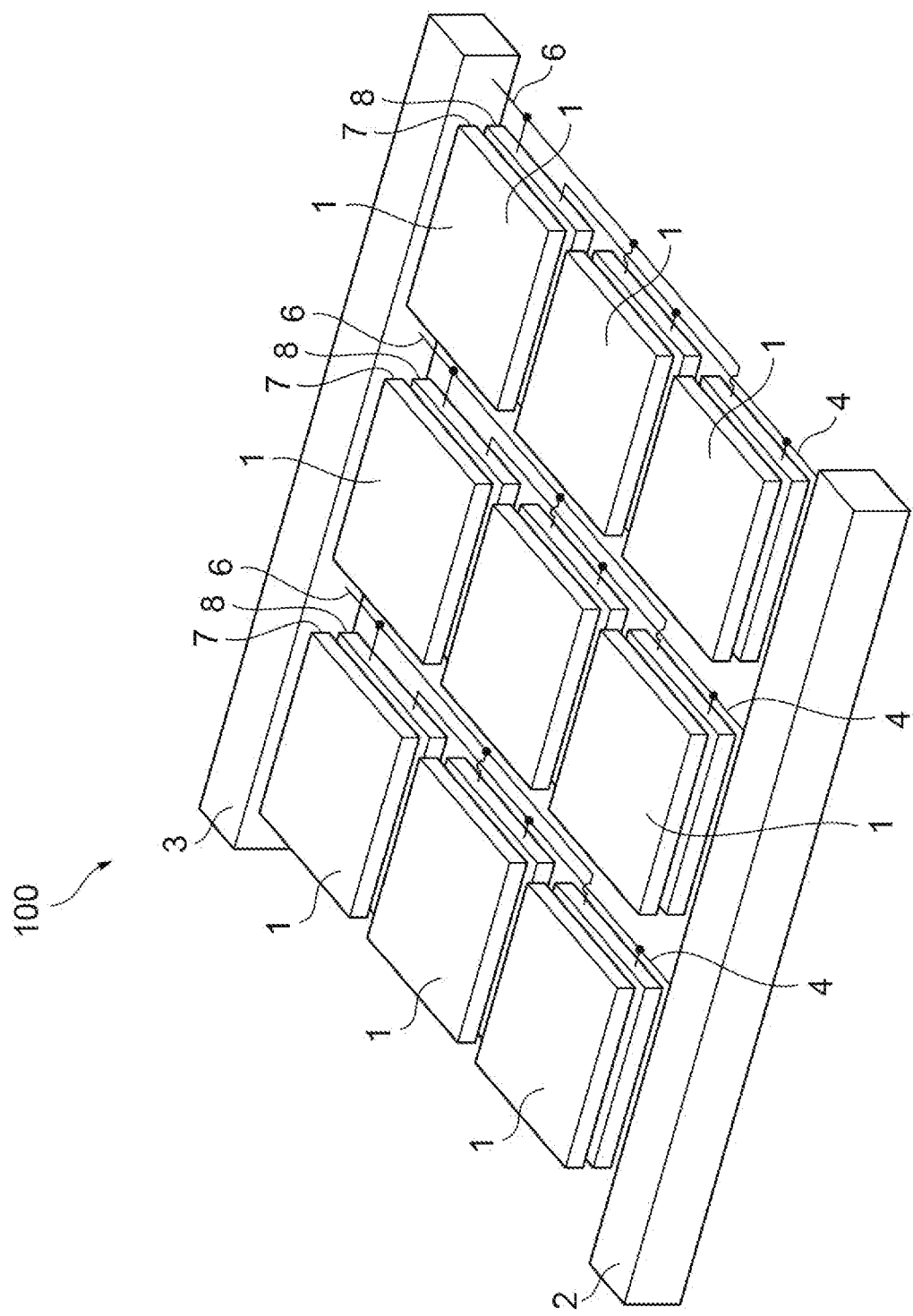
FIG. 1 is a diagram illustrating a radiation image sensor including a radiation detector of a first embodiment.

A radiation image sensor 100 illustrated in FIG. 1 obtains a two-dimensional image based on radiation arriving from a subject of examination. Radiation is, for example, gamma rays, X-rays, alpha rays, or beta rays. The radiation image sensor 100 has a radiation detector 1, a processing part 2, a control part 3, a read-out line 4, and a control signal line 6. The radiation image sensor 100 has a plurality of the radiation detectors 1. The radiation detectors 1 are arranged two-dimensionally. Thus, each radiation detector 1 corresponds to a pixel in the two-dimensional image. The radiation detectors 1 output pixel values corresponding to incident radiations. Each radiation detector 1 has a charge generator 7 (charge generation part) and a read-out circuit 8. The charge generator 7 and the read-out circuit 8 have a plate-like shape. The radiation detector 1 has a layered structure. Each charge generator 7 has one read-out circuit 8. In the radiation detector 1, the charge generator 7 is arranged on the read-out circuit 8. The charge generator 7 is electrically connected to the read-out circuit 8 via a bump electrode. The charge generator 7 outputs a signal corresponding to charge corresponding to each incident radiation. That is, the read-out circuit 8 processes the charge generated by the charge generator 7. As a result, the read-out circuit 8 generates an energy integrated signal φ2 (see FIG. 2) as a pixel value. The read-out circuit 8 outputs the energy integrated signal φ2 to the processing part 2 via the read-out line 4.

The processing part 2 is connected to the radiation detectors 1 via the read-out lines 4. The processing part 2 receives the energy integrated signals φ2 from the radiation detectors 1. For example, the processing part 2 outputs a two-dimensional image based on the received energy integrated signals φ2. The control part 3 is connected to the radiation detectors 1 via the control signal lines 6. The control part 3 provides a control signal θ (see FIG. 2) such as a clock signal to the radiation detector 1. A circuit configuration having such a two-dimensional arrangement can be achieved by forming an integrated circuit on a semiconductor substrate.

FIG. 2 illustrates the configuration of the radiation detector 1. As described above, the radiation detector 1 has the charge generator 7 and the read-out circuit 8.

The charge generator 7 receives radiation such as X-rays. The charge generator 7 generates electron-hole pairs (charge pairs) by the received X-rays. That is, the charge generator 7 converts the received radiation into a current signal (charge signal) corresponding to energy thereof. For example, a Cd(Zn)Te charge generator, a Si charge generator, a Ge charge generator, a GaAs charge generator, a GaN charge generator, or a TlBr charge generator may be used as the charge generator 7. A device having a scintillator and a photodetector may also be used as the charge generator 7. The scintillator converts X-rays into light. The photodetector converts the light generated by the scintillator into charge.

The read-out circuit 8 converts charge φ1 output by the charge generator 7 into the energy integrated signal φ2 which is a pixel value. The read-out circuit 8 outputs the energy integrated signal φ2 to the processing part 2. The energy integrated signal φ2 includes at least information on the energy of the incident radiation. The read-out circuit 8 has a preamplifier 9 (preamplification part), a signal converter 10 (signal conversion part), a memory 11, an energy discriminator 12 (energy discrimination part), an energy integrator 13 (energy integration part), and a forwarding memory 14. That is, one preamplifier 9, one signal converter 10, one memory 11, one energy discriminator 12, one energy integrator 13, and one forwarding memory 14 are connected to each charge generator 7.

The preamplifier 9 is connected to the charge generator 7 and the signal converter 10. The preamplifier 9 receives the charge φ1 from the charge generator 7. The preamplifier 9 then outputs an analog signal based on the charge φ1. The analog signal is expressed as a voltage. The preamplifier 9 receives the charge φ1 from the charge generator 7 and accumulates the charge φ1. The preamplifier 9 then outputs the voltage corresponding to the accumulated charge φ1. For example, the preamplifier 9 includes a capacitor 21 (see FIG. 3). The preamplifier 9 accumulates the charge φ1 in the capacitor 21. The preamplifier 9 outputs the voltage generated across the capacitor 21 due to the accumulation of the charge φ1 as an analog signal.

FIG. 3 shows an example of a circuit of the preamplifier 9. As illustrated in FIG. 3, a bias voltage is applied to a first terminal 7a of the charge generator 7. A second terminal 7b of the charge generator 7 is connected to an input 9a of the preamplifier 9. The preamplifier 9 has the capacitor 21 and a differential amplifier 22. The second terminal 7b of the charge generator 7 is connected to an inverting input 22b of the differential amplifier 22 via the input 9a. A ground potential is provided to a non-inverting input 22c of the differential amplifier 22. The capacitor 21 is connected between an output 22a and the inverting input 22b of the differential amplifier 22. By such a configuration, the charge φ1 that is input from the charge generator 7 is accumulated in the capacitor 21. The differential amplifier 22 generates the voltage corresponding to the accumulated charge φ1 at the output 22a. The voltage generated at the output 22a is an analog signal.

The operation of the preamplifier 9 is performed each time the radiation is incident on the charge generator 7. The generation of the charge φ1 at the charge generator 7 and the conversion into a voltage at the preamplifier 9 are completed in a very short period of time. For example, these operations are completed in several tens of nanoseconds. In other words, the time it takes for the charge φ1 to be accumulated in the capacitor 21 and the voltage across the capacitor 21 to be derived in this state is short. As a result, the effect of the phenomenon in which the charge φ1 is naturally lost from the capacitor 21 (so-called self-discharge) is suppressed. That is, a voltage corresponding to the charge φ1 generated at the charge generator 7 can be obtained.

As illustrated in FIG. 2, the signal converter 10 is connected to the preamplifier 9 and the memory 11. The signal converter 10 receives the analog signal from the preamplifier 9. The signal converter 10 converts the analog signal into a digital signal and outputs the digital signal. That is, the signal converter 10 is an A/D converter. For example, the resolution of the signal converter 10 may be 10 bits.

The memory 11 is connected to the signal converter 10 and the energy discriminator 12. The memory 11 receives the digital signal from the signal converter 10. The memory 11 stores the digital signal each time the digital signal is input. The memory 11 stores a plurality of the digital signals in a histogram. More specifically, the memory 11 categorizes the digital signals according to the magnitude of the digital signals by predetermined class based on the magnitude of the digital signal. For example, in the histogram stored in the memory 11, the horizontal axis represents the class based on the magnitude of the voltage indicated by the digital signal, and the vertical axis represents the frequency at which the digital signal corresponding to the class is input.

The energy discriminator 12 is connected to the memory 11 and the energy integrator 13. The energy discriminator 12 receives data from the memory 11 every preset period of time. This data is the histogram described above. That is, the operations of the charge generator 7, the signal converter 10, and the memory 11 are performed each time the radiation enters. The operations of the energy discriminator 12 and the energy integrator 13 are, on the other hand, performed every fixed period of time. That is, the operations of the energy discriminator 12 and the energy integrator 13 are not performed each time the radiation enters.

The energy discriminator 12 compares the class of the histogram to a threshold LLD. As a result of the comparison, the energy discriminator 12 outputs components of the class exceeding the threshold LLD as components to be integrated. This operation evaluates that the digital signals greater than a certain class (threshold LLD) are true signal components resulting from the radiation. In other words, this operation evaluates that the digital signals smaller than a certain class (threshold LLD) are false signal components (noise) not resulting from the radiation.

The energy integrator 13 is connected to the energy discriminator 12 and the forwarding memory 14. The energy integrator 13 receives the components to be integrated from the energy discriminator 12. The energy integrator 13 then integrates the components to be integrated and generates the energy integrated signal φ2. More specifically, the energy integrator 13 multiplies the class by the frequency for each class as a first arithmetic operation in the histogram output from the energy discriminator 12. Then, all of the values obtained as a result of the first arithmetic operation are added together as a second arithmetic operation. That is, the first and second arithmetic operations integrate the digital signal by energy. Noise is removed, by the energy discriminator 12, from the information provided to the first and second arithmetic operations. Thus, noise is not integrated in the integration operation performed by the energy integrator 13. In other words, the integration operation performed by the energy integrator 13 only integrates the true signal components.

The forwarding memory 14 is connected to the energy integrator 13. The forwarding memory 14 successively stores the energy integrated signals φ2 in a predetermined memory space. The forwarding memory 14 then outputs the energy integrated signals φ2 to the processing part 2 according to the control signal θ provided from the control part 3.

The operation and effects of the radiation detector 1 of the embodiment will be described below through comparison with the operations of radiation detectors 200, 300 according to comparative examples.

Figure 4:
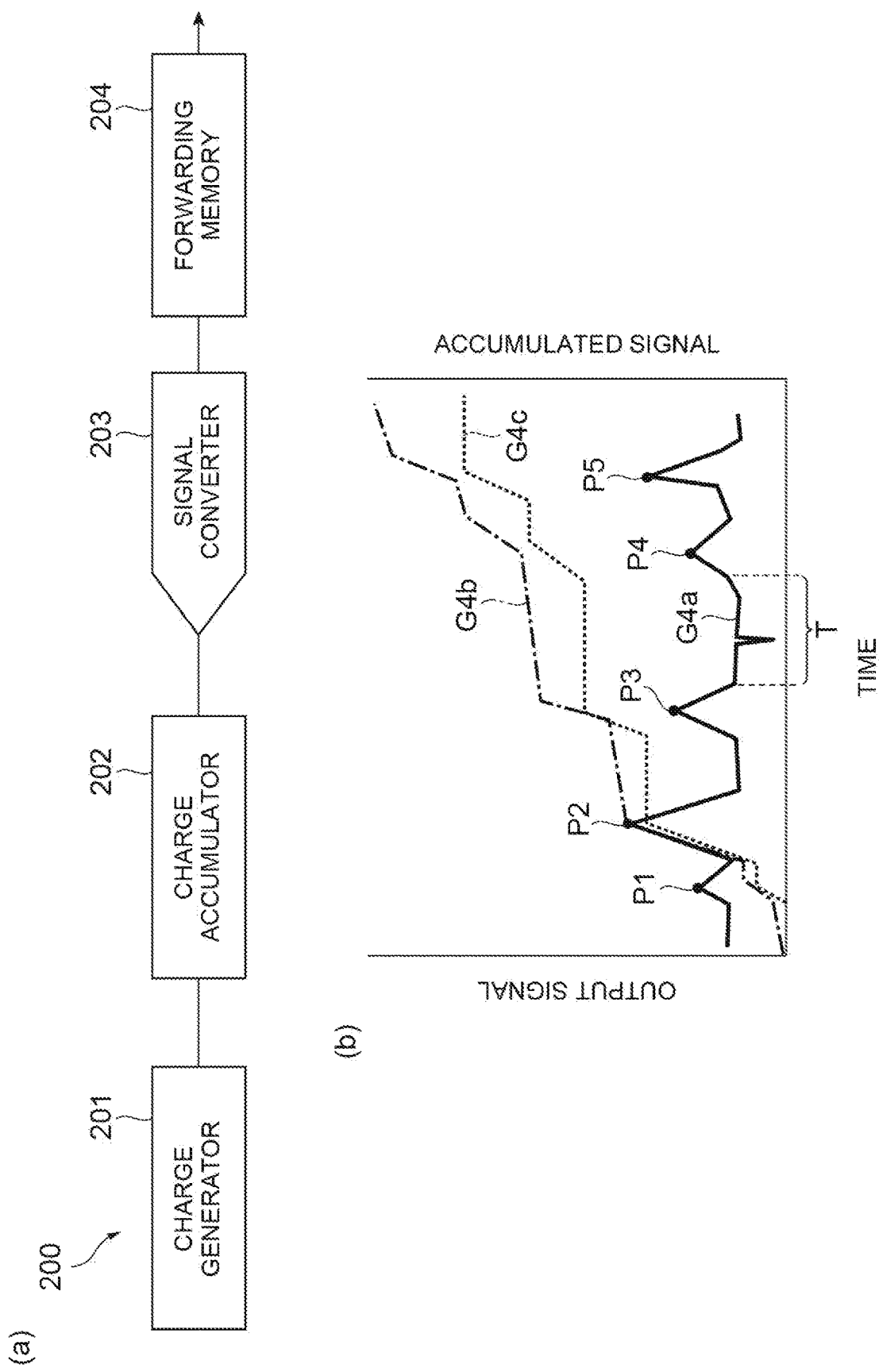
FIG. 4(a) is a diagram illustrating a radiation detector of comparative example 1.
FIG. 4(b) is a diagram illustrating an operation of the radiation detector of comparative example 1.

FIG. 4(a) is a block diagram illustrating the configuration of the radiation detector 200 according to comparative example 1. The radiation detector 200 employs the so-called charge accumulation method. The radiation detector 200 has a charge generator 201, a charge accumulator 202, a signal converter 203, and a forwarding memory 204. The charge generator 201, the signal converter 203, and the forwarding memory 204 have the same configurations as those of the embodiment above. Detailed description thereof is thus omitted.

The charge accumulator 202 accumulates charge output from the charge generator 201. The charge accumulator 202 then provides a voltage corresponding to the accumulated charge to the signal converter 203. The values of the voltages output by the charge accumulator 202 are consecutive, and are so-called analog values.

Reference will now be made to the graph shown in FIG. 4(b) which illustrates an output of the charge generator 201 (graph G4a) and an output of the charge accumulator 202 (graph G4b). The horizontal axis represents time. The left vertical axis represents the output of the charge generator 201. The right vertical axis represents the output of the charge accumulator 202. As shown by the graph G4a, the output of the charge generator 201 is continuous in time. The output increases upon the incidence of radiation, and causes peaks P1, P2, P3, P4, P5 corresponding to the energy of the radiation to appear. The charge generator 201 continues to output values of irregular magnitude also during periods in which there is no incident radiation (for example, see period T). This output is the noise deriving from the charge generator 201.

The charge accumulator 202 successively integrates the output shown by the graph G4a. In other words, the charge accumulator 202 continues to add up the output of the charge generator 201. As a result, the graph G4b is obtained. That is, the radiation detector 200 does not need to count the particles resulting from the radiation incident on the charge generator 201. The radiation detector 200 thus does not fail to detect signals.

It has already been described that the output of the charge generator 201 includes noise. The charge accumulator 202 thus successively adds up not only components resulting from the incident radiation (peak P1, etc.), but also components resulting from noise (output signal during period T).

As a result, the output of the charge accumulator 202 (graph G4b) is greater than the result of a case in which only the components resulting from the incident radiation are added up (graph G4c). The difference between the graphs G4b and G4c is due to the addition of noise. In FIG. 4(b), the region surrounded by the graphs G4c and G4b represents the error due to noise.

This tendency is evident particularly during the measurement of low energy, and the components resulting from the incident radiation (true signal components) may become buried in noise.

Comparative Example 2

Figure 5:
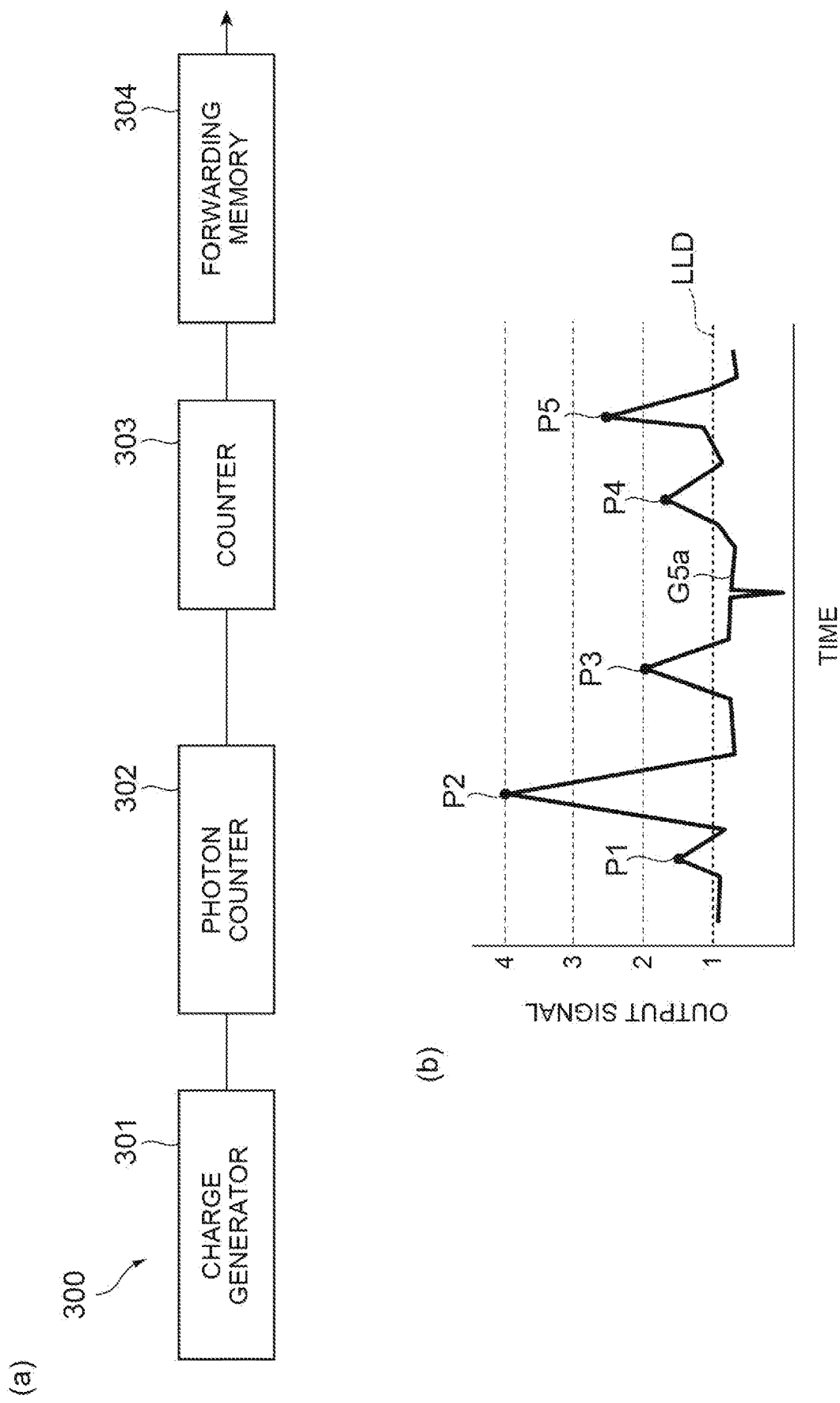
FIG. 5(a) is a diagram illustrating a radiation detector of comparative example 2.
FIG. 5(b) is a diagram illustrating an operation of the radiation detector of comparative example 2.

FIG. 5 is a block diagram illustrating the configuration of the radiation detector 300 according to comparative example 2. The radiation detector 300 employs the photon counting method. The photon counting radiation detector 300 removes noise from signals output from a charge generator 301 to enable imaging without background noise.

The radiation detector 300 has the charge generator 301, a photon counter 302, a counter 303, and a forwarding memory 304. The charge generator 301 and the forwarding memory 304 are the same as those of the embodiment, and thus detailed description thereof is omitted.

The photon counter 302 receives charge output from the charge generator 301. The photon counter 302 then discriminates the received output into signal components resulting from incident radiation and noise. FIG. 5(b) illustrates an output signal of the charge generator 301 (graph G5a). As illustrated in FIG. 5(b), the photon counter 302 extracts the signal components greater than the threshold LLD (peaks P1, P2, P3, P4, P5) as the signal components resulting from the incident radiation.

The counter 303 counts the number of the extracted signal components using the output of the photon counter 302. For example, in the example illustrated in FIG. 5(b), the photon counter 302 extracts the peaks P1, P2, P3, P4, P5 as the signal components. The counter 303 then outputs "5" as the number of the peaks P1, P2, P3, P4, P5 to the forwarding memory 304.

The radiation detector 300 discriminates the true signal components resulting from the incident radiation from noise by processing by the photon counter 302 and the counter 303. Thus, noise is not integrated such as in the radiation detector 200 of comparative example 1. This enables imaging without background noise.

The timing of the incident radiation will now be discussed. When radiation is considered as particles, a large dose means that the number of particles incident on the charge generator 301 per unit time increases, so that the intervals between the incidences of particles are shorter. When the intervals between the incidences of particles are too short for individual particles to be distinguished, the read-out circuit 8 loses count of the particles. The phenomenon in which such uncertainty in counting occurs is referred to as pile-up.

For example, when the magnitude is "4" as indicated by the peak P2, it cannot be determined whether the peak P2 means an incidence of a particle having an energy of "4" or almost simultaneous incidences of four particles each having an energy of "1". From the perspective of counting the number of incident particles, the peak P2 is determined as the incidence of one particle. However, in reality, if it were the case of almost simultaneous incidences of four particles each having an energy of "1," it means that three particles were not counted.

Pile-up tends to occur especially when the dose of radiation is large. The output of the radiation detector 300 tends to saturate due to frequent pile-up. Pile-up also causes the deterioration of linearity between the energy of radiation and the counted number of particles.

The radiation detector 1 of the first embodiment has both the advantages of the charge accumulation method and the photon counting method. The radiation detector 1 is capable of achieving an image sensor that is based on the processing of the charge accumulation method, but also has the advantage of the photon counting method. The radiation detector 1 has the effect of the charge accumulation method of not being affected by pile-up. The radiation detector 1 also has the effect of the photon counting method of being noiseless. These effects enable the radiation detector 1 to perform energy integration while imaging without background noise, to thereby significantly improve the linearity of radiation with respect to energy.

Specifically, the signal converter 10 converts the analog signal output from the preamplifier 9 into a digital signal. The energy discriminator 12 then discriminates the signal components based on the incident radiation from the signal components based on noise included in the digital signal. The advantage of the photon counting radiation detector can be exhibited by this discrimination operation. Furthermore, the energy integrator 13 integrates the components to be integrated from which noise has been removed. In other words, the energy integration operation that performs a noise removal function is performed after spectrum measurement. Information which can evaluate the energy of the radiation (energy integrated signal φ2) can be obtained by this integration operation. That is, loss of information due to pile-up does not occur. The radiation detector 1 is thus capable of reducing noise without losing information relating to the energy of the detected radiation.

The operation of the radiation detector 1 can also be expressed by a weight function F1 shown in FIG. 6(a). The weight function F1 defines a weighting coefficient to be zero when the energy of the radiation is from zero to the threshold LLD (portion F1a). The weight function F1 defines a weighting coefficient corresponding to the energy of the radiation when the energy of the radiation is more than or equal to the threshold LLD (portion F1b). Specifically, the weighting coefficient of the portion F1b is proportional to the energy of the radiation. The starting point of the portion F1b of the weight function F1 is the threshold LLD. The weight function F1 is an example of the energy integration operation. Such weight function F1 is achieved by combining two weight functions F2 and F3.

The weight function F2 shown in FIG. 6(b) defines the weighting coefficient to be zero when the energy of the radiation is from zero to the threshold LLD (portion F2a). The portion F2a constitutes the portion F1a together with a portion F3a described below. The weighting coefficient is proportional to the energy of the radiation when the energy of the radiation is more than or equal to the threshold LLD (portion F2b). The portion F2b constitutes the portion F1b together with a portion F3b described below. The starting point of the portion F2b of the weight function F2 is zero.

The weight function F2 corresponds to the energy integration operation. The weight function F3 shown in FIG. 6(c) defines the weighting coefficient to be zero when the energy of the radiation is from zero to the threshold LLD (portion F3a). The portion F3a constitutes the portion F1a together with the portion F2a. The weighting coefficient is constant regardless of the energy of the radiation when the energy is more than or equal to the threshold LLD (portion F3b). The portion F3b constitutes the portion F1b together with the portion F2b. The weight function F3 uses a constant weighting coefficient regardless of the energy of the radiation. That is, the weight function F3 corresponds to the photon counting operation.

The output of the signal converter 10 and the energy discriminator 12 that perform a spectrum measurement operation have a relatively large data volume. However, the amount of data is compressed by the integration operation of the energy integrator 13. As a result, the data volume is compressed to an externally transferable degree when data is transferred externally. Furthermore, the data volume is compressed more than a data volume output from a high resolution full spectrum measurement circuit. The capacity of the forwarding memory 14 can thus be reduced.

Second Embodiment

The radiation detector 1 of the first embodiment stores data expressed as a histogram in the memory 11. Such a data format requires a vast memory space. The physical size of the memory 11 thus also tends to be large. Furthermore, the integration operation performed by the energy integrator 13 of the radiation detector 1 of the first embodiment is relatively complex. The physical size of the energy integrator 13 thus also tends to be large. A radiation detector 1A of a second embodiment achieves a smaller size.

FIG. 7 illustrates the configuration of the radiation detector 1A that composes a radiation image sensor 100A. The radiation detector 1A has the charge generator 7, the preamplifier 9, the signal converter 10, the energy discriminator 12, and an energy integrator 15. The radiation detector 1A of the second embodiment has first to third differences from the radiation detector 1 of the first embodiment. The first difference is that, in the radiation detector 1A, the signal converter 10, the energy discriminator 12, and the energy integrator 13 operate each time a radiation is incident on the charge generator 7. The second difference is that the operation of the energy integrator 13 is different from the operation of the energy integrator 13 of the first embodiment. The third difference is that, in the radiation detector 1A, the output of the signal converter 10 is provided directly to the energy discriminator 12. That is, the radiation detector 1A does not have the memory 11 between the signal converter 10 and the energy discriminator 12. It should be noted that the charge generator 7, the preamplifier 9, and the signal converter 10 are the same as the charge generator 7 and the signal converter 10 of the first embodiment, and thus detailed description thereof is omitted.

The energy integrator 15 has an adder 15a and a memory 15b. An input of the energy integrator 15 is connected to a first input of the adder 15a. An output of the memory 15b is connected to a second input of the adder 15a. An output of the adder 15a is connected to an input of the memory 11. The output of the memory 11 is connected to an output of the energy integrator 15 and the second input of the adder 15a.

<Operation>

The operation of the radiation detector 1A will be described next. When a radiation is incident on the charge generator 7, the charge generator 7 outputs charge φ1 to the preamplifier 9. The preamplifier 9 that has received the charge φ1 outputs an analog signal corresponding to the charge φ1 to the signal converter 10. The signal converter 10 that has received the analog signal converts the analog signal into a digital signal, and then outputs the digital signal to the energy discriminator 12. The energy discriminator 12 that has received the digital signal then outputs components to be integrated φ3 to the energy integrator 15 by performing a discrimination operation. Next, the energy integrator 15 inputs the components to be integrated φ3 to the first input of the adder 15a. The energy integrator 15 also inputs an intermediate integrated value φ4 stored in the memory 15b to the second input of the adder 15a. The adder 15a adds the components to be integrated φ3 to the intermediate integrated value φ4 (φ3+φ4). The value obtained by the addition is stored in the memory 11 as a new intermediate integrated value φ4. The memory 15b receives a control signal θ from the control part 3 each time a predetermined time elapses. The memory 15b outputs the intermediate integrated value φ4 as an energy integrated signal φ2 to the processing part 2 according to the control signal θ.

The radiation detector 1A of the second embodiment performs the integration operation each time the radiation enters. That is, the memory 11 that stores a plurality of pieces of information is not required before the energy integrator 15. The memory 11 of the first embodiment can thus be omitted. Additionally, the radiation detector 1A of the second embodiment stores the result of the integration operation in the memory 15b as one numerical value (intermediate integrated value φ4). That is, the memory 15b does not require a vast memory space such as in the memory 11 of the first embodiment. It is thus possible to reduce the physical size of the memory 15b. Furthermore, in the energy integrator 15 of the second embodiment, the adder 15a performs only simple addition operations. That is, the operation of obtaining a product of the class and frequency and the operation of obtaining the summation of the results of the multiplication operations are not required such as in the first embodiment. In other words, the integration operation can be simplified. The physical size of the energy integrator 15 can thus be reduced.

Third Embodiment

A radiation detector 1B of a third embodiment achieves an even smaller size compared with the radiation detector 1A of the second embodiment.

FIG. 8 illustrates the configuration of the radiation detector 1B of the third embodiment that composes a radiation image sensor 100B. The radiation detector 1B has the charge generator 7, the preamplifier 9, a signal converter 10B, an energy discriminator 12B, an energy integrator 16, and an energy corrector 17 (energy correction part). The radiation detector 1B of the third embodiment has four differences from the radiation detector 1A of the second embodiment. The first difference is the operation of the signal converter 10B. The second difference is the operation of the energy discriminator 12B. The third difference is the operation of the energy integrator 16. The fourth difference is that the radiation detector 1B has the energy corrector 17.

The signal converter 10B generates a pulse signal as the digital signal. The signal converter 10B outputs a plurality of pulse waves corresponding to the magnitude of the digital signal. For example, the larger the magnitude of the digital signal, the more pulse waves the signal converter 10B outputs. That is, the signal converter 10B is a so-called pulse width modulator (PWM).

The energy discriminator 12B subjects the pulse signal input from the signal converter 10B to a discrimination process. It has already been mentioned that the number of the pulse waves included in the pulse signal corresponds to the magnitude of the digital signal. Thus, when the number of the pulse waves is small, such as 1 or 2, it is likely that they are noise. Therefore, when the pulse signal includes first to N-th pulse waves, the energy discriminator 12B removes the first to i-th pulse waves as noise. Consequently, the number of pulses (i) considered as noise is the threshold LLD of the energy discriminator 12 of the third embodiment. That is, the energy discriminator 12 outputs i+1-th to N-th pulse waves as the true signal components (components to be integrated).

The energy integrator 16 includes a counter 16a. The counter 16a adds a count variable (k) each time a pulse wave is input from the energy discriminator 12. That is, the counter 16a sequentially counts the number of the pulse waves that are input. For example, when five pulse waves enter the counter 16a in response to an incidence of the radiation, the counter 16a generates a variable (k=5). When six pulse waves enter the counter 16a in response to the next incidence of the radiation, the counter 16a starts counting from the variable (k=5) and generates a variable (k=11). That is, in the energy integrator 13, the operation of sequentially counting the number of the pulse waves that are input corresponds to the integration operation. That is, the energy integrator 16 can be achieved by just the counter 16a. The circuit of the counter 16a can be made smaller more easily than the circuit of the adder 15a.

By having the energy corrector 17, the radiation detector 1B is capable of further increasing the accuracy of energy integrated signals obtained based on the output of the counter 16a. That is, the radiation detector 1B may have the energy corrector 17 as required. In other words, the radiation detector 1B may be composed of the charge generator 7, the preamplifier 9, the signal converter 10B, the energy discriminator 12B, and the energy integrator 16.

Specifically, the number of the pulse waves counted by the counter 16a does not strictly correspond to the energy of the incident radiation, because the first to i-th pulse waves are uniformly deleted by the energy discriminator 12. That is, the energy of the radiation indicated by the number of the pulse waves counted by the counter 16a is smaller than the energy of the incident radiation. This operation corresponds to the weight function F2. The energy corrector 17 corrects this difference in the energy.

The energy corrector 17 has a counter 17a, an amplifier 17b, and an adder 17c. An input of the counter 17a is connected to an output of the energy discriminator 12B. An input of the amplifier 17b is connected to an output of the counter 17a. An output of the amplifier 17b is connected to a second input of the adder 17c. The output of the counter 16a is connected to a first input of the adder 17c. An output of the adder 17c is connected to the processing part 2.

It should be noted that the preamplifier 9, the signal converter 10B, the energy discriminator 12B, and the counters 16a, 17a may constitute the read-out circuit 8B. That is, these elements are provided for each charge generator 7. Thus, these elements operate each time the radiation enters. The amplifier 17b and the adder 17c may be provided as a separate circuit from the read-out circuit 8b. Thus, these elements operate each time a predetermined time elapses.

<Operation Example 1 (No Pile-Up)>

As a first example, an operation in which the so-called pile-up does not occur will be described. As illustrated in FIG. 9(a), it is assumed that a first incidence E1 and a second incidence E2 have occurred. The energy of both incidences are assumed to be "5." The second incidence E2 occurred a sufficient time after the first incidence E1. For example, the signal converter 10 according to the first embodiment outputs a digital signal as illustrated in FIG. 9(b). The digital signal includes a component D1 corresponding to the first incidence E1 and a component D2 corresponding to the second incidence. The digital signal may also include components N1, N2, N3 corresponding to noise. As illustrated by the components D1, D2, the component D2 corresponding to the second incidence E2 can be distinguished from the component D1 corresponding to the first incidence E1 since the second incidence E2 occurred a sufficient time after the first incidence E1. That is, the digital signal illustrated in FIG. 9(b) shows that there were two incidences of radiation. Thus, no pile-up has occurred.

FIG. 9(c) illustrates a pulse signal P which is the digital signal output by the signal converter 10B of the third embodiment. The pulse signal P includes pulse components DP1, DP2, NP1, NP2, NP3. The pulse signal P is input to the energy discriminator 12B. As a result, the energy discriminator 12B outputs a pulse signal PS illustrated in FIG. 9(d). The energy discriminator 12B defines the number of pulses (i=2) as the threshold LLD. The energy discriminator 12B then deletes a first pulse wave and a second pulse wave from each of the pulse components DP1, DP2, NP1, NP2, NP3. The pulse components NP1, NP2, NP3 which are noise are thus removed, and the pulse components DP1, DP2, which are the true signal components, each includes three pulse waves. That is, the pulse signal PS output by the energy discriminator 12B includes two pulse components DP1, DP2, thereby indicating that there were two incidences of radiation. Additionally, the pulse components DP1, DP2 each includes three pulse waves. Thus, the energy of the incident radiation can be obtained from the number of the pulse waves.

When the first pulse component DP1 of the pulse signal PS is input to the energy integrator 16, the counter 16a of the energy integrator 16 obtains a variable (k=3). The first pulse component DP1 is also input to the counter 17a in parallel with the operation of the first pulse component DP1 being input to the energy integrator 16. The counter 17a obtains a variable (j=1) from an input of the pulse component DP1.

When the second pulse component DP2 of the pulse signal PS is input to the energy integrator 16, the counter 16a of the energy integrator 16 obtains a variable (k=6=3+3). The second pulse component DP2 is also input to the counter 17a in parallel with the operation of the second pulse component DP2 being input to the energy integrator 13. The counter 17a obtains a variable (j=2=1+1) from a second input of the pulse component DP2.

Next, since a predetermined time has elapsed, the control signal θ for readout is output from the control part 3 to the counters 16a, 17a. The counter 16a outputs the variable (k=6) to the adder 17c. The counter 17a outputs the variable (j=2) to the amplifier 17b. The amplifier 17b multiplies the variable (j=2) by the number of pulses (i=2) which is the threshold LLD. As a result, the amplifier 17b outputs an amplified variable (s=4) to the adder 17c. The adder 17c adds the variable (k=6) and the variable (s=4) together. As a result, a calculated value (10) is obtained. The calculated value (10) corresponds to the energy integrated value of the two incidences of radiation since the energy of the first incidence of radiation is "5" and the energy of the second incidence of radiation is also "5". That is, the radiation detector 1 is capable of obtaining "10" as the energy integrated signal φ2 which corresponds to the energy of the radiation even when there is noise in the output of the preamplifier 9.

It should be noted that in the case in which the radiation detector does not have the energy discriminator 12, the counter 16a of the energy integrator 16 counts the number of all the pulse waves including the pulse signal P illustrated in FIG. 9(c). That is, the counter 16a obtains a variable (k=15) as an integrated value. Since the pulse components NP1, NP2, NP3 resulting from noise are also integrated, "15" which is larger than the true value "10" is output.

<Operation Example 2 (with Pile-Up)>

As a second example, an operation in which the so-called pile-up occurs will be described. As illustrated in FIG. 10(a), it is assumed that a first incidence E1 and a second incidence E2 have occurred. The energy of both incidences are assumed to be "5." The second incidence E2 occurred at a time when sufficient time has not elapsed after the first incidence E1. For example, the signal converter 10B according to the first embodiment outputs a digital signal as illustrated in FIG. 10(b). The digital signal includes a component D1 corresponding to the first incidence E1 and a component D2 corresponding to the second incidence. However, the component D2 corresponding to the second incidence E2 combines with the component D2 corresponding to the first incidence E1 to form a component DA. That is, according to the digital signal illustrated in FIG. 10(b), it will be determined that there was one incidence of radiation. Thus, the number of the actual incidences of radiation (twice) is miscounted. That is, pile-up has occurred. However, the radiation detector 1B of the third embodiment is capable of obtaining "10" as the energy integrated value even in such a case.

The signal converter 10B of the third embodiment outputs a pulse signal P illustrated in FIG. 10(c) as a result of the first incidence E1 and the second incidence E2. The pulse signal P includes a pulse component DP. The pulse component DP includes first to tenth pulse waves.

The energy discriminator 12B that has received this pulse signal P deletes the first and second pulse waves based on the number of pulses (i=2) which is the threshold LLD. As a result, the energy discriminator 12B outputs the third to tenth pulse waves as a pulse signal PS.

When the pulse signal PS is input to the energy integrator 16, the counter 16a of the energy integrator 16 obtains a variable (k=8). The pulse signal PS is also input to the counter 17a in parallel with the operation of the pulse signal PS being input to the energy integrator 16. The counter 17a obtains a variable (j=1) from an input of the pulse component Dp.

Next, since a predetermined time has elapsed, the control signal θ is output from the control part 3 to the counters 16a, 17a. The counter 16a outputs the variable (k=8) to the adder 17c. The counter 17a outputs the variable (j=1) to the amplifier 17b. The amplifier 17b multiplies the variable (j=1) by the number of pulses (i=2) which is the threshold LLD. As a result, the amplifier 17b outputs an amplified variable (s=2) to the adder 17c. The adder 17c adds the variable (k=8) and the variable (s=2) together. As a result, a calculated value (10) corresponding to the energy integrated value is obtained.

The radiation detector of the present disclosure is not limited to the embodiments described above. Various modifications of the radiation detector of the present disclosure are possible without departing from the scope of the claims.

In the radiation detector 1 of the embodiment, the charge generator 7 and the read-out circuit 8 are stacked. For example, as illustrated in FIG. 11, a radiation image sensor 100C may include radiation detectors 1C of variation 1. Each radiation detector 1C has the charge generator 7 and the read-out circuit 8. The individual configurations thereof are the same as the charge generator 7 and the read-out circuit 8 of the radiation detector 1. However, in the radiation detector 1C, the charge generator 7 and the read-out circuit 8 are not stacked, but are arranged side by side on the main surface of a substrate 101. The radiation detector 1C having such a configuration is also capable of producing the same effect as that of the radiation detector 1 of the embodiment.

The radiation detector 1 of the embodiment has one charge generator 7 and one read-out circuit 8. For example, as illustrated in FIGS. 12 and 13, a radiation image sensor 100D may have a radiation detector 1D of variation 2. The radiation detector 1D has a charge generator 7D and a plurality of the read-out circuits 8. The plurality of the read-out circuits 8 are electrically connected to a rear surface of the charge generator 7D. The charge generator 7D is not physically divided. The charge generator 7D is electrically divided by being electrically connected to the read-out circuits 8. The radiation detector 1D having such a configuration is also capable of producing the same effect as that of the radiation detector 1 of the embodiment.

The circuit configurations illustrated in FIG. 3 may also have an additional circuit. FIG. 14 is a variation of the specific circuit configurations including the charge generator 7, the preamplifier 9, and the signal converter 10. A charge injection circuit 31 is added as the additional circuit in this variation. In the configuration illustrated in FIG. 14, a bias voltage is applied to the first terminal 7a of the charge generator 7. The second terminal 7b of the charge generator 7 is connected to an input of the preamplifier 9. The preamplifier 9 is composed of the differential amplifier 22 and the capacitor 21. The non-inverting input 22c of the differential amplifier 22 is connected to a ground potential. The inverting input 22b of the differential amplifier 22 is connected to the charge generator 7. The capacitor 21 is connected between the output and the inverting input of the differential amplifier 22. By such a configuration, the charge that is input from the charge generator 7 is accumulated in the capacitor 21, and a voltage signal corresponding to the amount of the charge is generated at the output of the differential amplifier 22.

The charge injection circuit 31 is a switched-capacitor circuit. The charge injection circuit 31 includes a DC power source 31a, a capacitor 31b, and switching elements 31c, 31d, 31e, 31E The charge injection circuit 31 having such a configuration receives a comparison signal EN from the signal converter 10, and a clock signal CLOCK synchronized with periodic comparison operations by the signal converter 10. When the comparison signal EN indicates a high level at a timing synchronized with the clock signal CLOCK, the charge injection circuit 31 supplies charge to the capacitor 21 of the preamplifier 9 in an amount corresponding to a voltage of the DC power source 31a accumulated in advance in the capacitor 31b. In doing so, the polarity of the DC power source 31a is set such that the charge supplied from the capacitor 31b to the capacitor 21 has a polarity opposite to the polarity of the charge supplied from the charge generator 7 to the capacitor 21. Specifically, one end of the DC power source 31a is connected to a ground potential. The other end of the DC power source 31a is connected to one end of the capacitor 31b via the switching element 31c. The other end of the capacitor 31b is connected to a terminal of the capacitor 21 on a side closer to the charge generator 7 via the switching element 31f. Furthermore, both ends of the capacitor 31b are connected to ground potentials via switching elements 31d, 31e. In the charge injection circuit 31 of the configuration above, when the switching elements 31c, 31e are closed, the switching elements 31d, 31f are opened. As a result, charge is accumulated in advance in the capacitor 31b. Thereafter, when the comparison signal EN indicates a high level at a timing synchronized with the clock signal CLOCK, the switching elements 31c, 31e are opened and the switching elements 31d, 31f are closed. As a result, the charge accumulated in the capacitor 31b is supplied to the capacitor 21.

In the radiation detectors described above, the preamplifier 9 and the signal converter 10 have been described as different elements. The preamplifier 9 and the signal converter 10 may be an integrated element exhibiting the functions of amplification and signal conversion. That is, the preamplifier 9 and the signal converter 10 may be integrated with each other. Furthermore, in the radiation detectors described above, the preamplifier 9 has been described to perform an amplification function. It is only required that the preamplifier 9 is capable of converting the signal (charge) output by the charge generator 7 into a signal (for example, voltage) that can be processed by the signal converter 10. That is, the preamplifier 9 does not necessarily have to perform an amplification function of the signal.

REFERENCE SIGNS LIST 1, 1A, 1B, 1C, 1D Radiation detector
2 Processing part
3 Control part
4 Read-out line
6 Control signal line
7 Charge generator
8 Read-out circuit
9 Preamplifier
10 Signal converter
12 Energy discriminator
13, 15, 16 Energy integrator
14 Forwarding memory
100, 100A, 100B, 100C, 100D Radiation image sensor

The invention claimed is:

1. A radiation image sensor with radiation detectors arranged two-dimensionally, the radiation image sensor comprising:
   a charge generation part configured to generate charge corresponding to energy of an incident radiation;
   a preamplification part configured to output an analog signal corresponding to the charge;
   a pulse width modulator configured to receive and convert the analog signal into a digital signal;
   an energy discrimination part configured to compare the digital signal to a threshold value and output components of the digital signal exceeding the threshold value; and
   an energy integration part configured to obtain an energy integrated value defined as a summation of every preset period of time of the components exceeding the threshold value, wherein
   the preamplification part is configured to output the analog signal each time the radiation enters,
   the pulse width modulator is configured to output the digital signal indicating a magnitude of the analog signal by N pulse waves (N being an integer of one or more) each time the analog signal is received,
   the energy integration part is configured to add up the number of the pulse waves making up the components exceeding the threshold value each time the components exceeding the threshold value is received.

2. The radiation image sensor according to claim 1, wherein the energy discrimination part is configured to output i+1-th (i being an integer of 1 or more) to N-th pulse waves of the N pulse waves as the components exceeding the threshold value.

3. The radiation image sensor according to claim 2, further comprising:
   a counter connected in parallel with the energy integration part, and configured to count the number of inputs of the digital signal to the energy integration part; and
   an energy correction part connected to the counter and the energy integration part, and configured to correct the energy integrated value output by the energy integration part using the number of the inputs and a threshold value indicated by the first to the i-th pulse waves.

* * * * *